No. 852,176. PATENTED APR. 30, 1907.
A. J. GARRISON.
AXLE NUT LOCK.
APPLICATION FILED MAY 26, 1906.

Witnesses
Inventor
A. J. Garrison
By R. A. Lacey
Attorneys

UNITED STATES PATENT OFFICE.

AURELIUS J. GARRISON, OF GREENVILLE, VIRGINIA.

AXLE-NUT LOCK.

No. 852,176.　　　　　Specification of Letters Patent.　　　　Patented April 30, 1907.

Application filed May 26, 1906. Serial No. 318,946.

*To all whom it may concern:*

Be it known that I, AURELIUS J. GARRISON, a citizen of the United States, residing at Greenville, in the county of Augusta and State of Virginia, have invented certain new and useful Improvements in Axle-Nut Locks, of which the following is a specification.

This invention consists of a novel form of locking device particularly designed for nuts of vehicle axles in order to prevent accidental displacement thereof by unscrewing from the threaded end portion of the spindle of the axles.

The invention resides particularly in the simple and meritorious construction of the device, and in the novel details of construction, the advantages of which will be very fully presented hereinafter, and which will be finally claimed.

Figure 1:
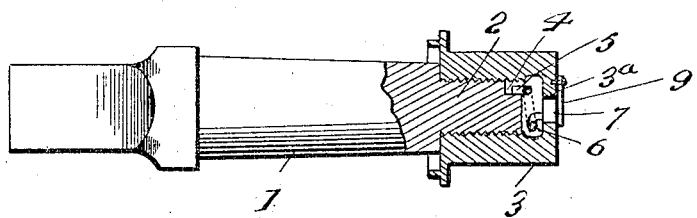
Figure 2:
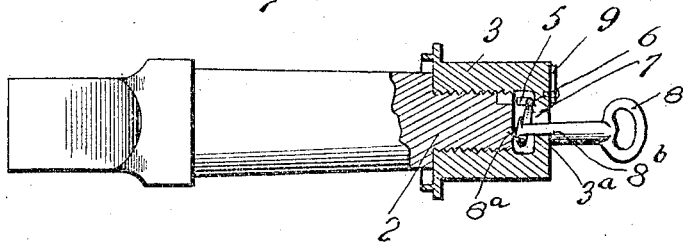
Figure 3:
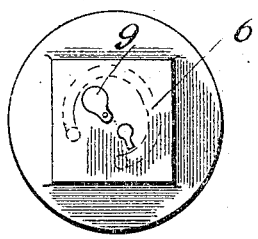
Figure 4:
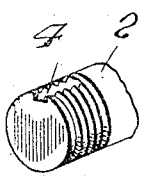

For a full description of the invention and the merits thereof and also to acquire a knowledge of the details of construction of the means for effecting the result, reference is to be had to the following description and accompanying drawings, in which:

Figure 1 is a longitudinal sectional view through the spindle of an axle, showing a nut applied thereto and illustrating the application of the invention; Fig. 2 is a view similar to Fig. 1, showing the key for operating the locking member in the position assumed thereby when the nut is unlocked; Fig. 3 is an end view of the axle nut; and, Fig. 4 is a broken perspective view showing the threaded portion of the spindle and the recess therein.

Corresponding and like parts are referred to in the following description and indicated in all the views of the drawings by the same reference characters.

In the practical embodiment of the invention and specifically describing the same, the usual spindle 1 is employed, the same having the customary threaded extremity 2 upon which the axle nut 3 is adapted to be screwed. The nut 3 in general form is substantially the same as those in common use. The outer end portion of the threaded extremity 2 of the spindle 1 is formed with a longitudinal recess 4 extending a short distance into the threaded portion. The recess 4 is adapted, in the actual use of the invention, to receive therein a small pawl 5 which is applied to the nut 3 at the outer end portion thereof. The pawl 5 is carried by a somewhat semicircular shaped spring 6 being attached to one end of said spring, the opposite end of spring 6 being attached in any substantial way to the inner side of the outer inclosing end $3^a$ of the nut 3. The threaded portion of the nut 3 terminates a short distance from the outer inclosing end $3^a$ thereof and forms a space within the nut in which the spring 6 is received and in which said spring is adapted for a certain amount of movement toward the portion $3^a$ of the nut in order that the pawl 5 may engage with and be disengaged from the recessed portion 4 of the threaded end 2 of spindle 1. The pawl 5 projects inwardly from the spring 6 and is movable into and out of said recess 4, as above premised.

The outer inclosing end $3^a$ of the nut 3 is formed with a key opening 7 through which is adapted to pass an end portion of a key 8. The key 8 is formed with a projection $8^a$ at one end, adapted to engage with the spring 6, whereby said key when pulled outwardly will disengage the pawl 5 from the recess 4. When the pawl 5 engages the threaded portion 2 of the spindle 1, it will be obvious that the nut 3 cannot turn in either direction. When the key 8, however, is operative to actuate the spring 6 and disengage the pawl 5, the nut 3 may be readily unscrewed in an obvious manner.

Adjacent to its projection $8^a$, the key 8 is formed with a shoulder $8^b$ and this shoulder, after the key has been pulled outwardly to disengage the spring pawl 5, can be readily turned so as to cause the shoulder $8^b$ to abut against the outer face of the inclosing end $3^a$ of the nut 3, and by this action, the key 8 will be so disposed as to hold the pawl 5 out of engagement with the threaded portion 2 of the spindle 1.

When the nut has been applied to the spindle 1, and it is desired to lock the same thereto, it is only necessary to disengage the shoulder $8^b$ of key 8 from the portion $3^a$ of the nut 3 and the spring 6 will cause pawl 5 to engage the threaded portion 2 of said spindle. The key 8 may, however, be moved to disengage its projection $8^a$ from the spring 6 and the nut will be locked in place.

It is preferred that the outer space of the portion $3^a$ of the nut 3 be provided with a sliding plate 9 adapted to move over the opening 7 to thereby prevent entrance of dust or foreign matter detrimental to the proper working of the nut.

Having thus described the invention, what is claimed as new is:

1. In a nut lock, the combination of a spindle having the outer threaded end thereof provided with a recess, an axle nut mounted on the threaded portion of the spindle and provided at its outer end with a key opening, a spring attached to the inner side of the outer inclosing end of the axle nut, a pawl carried by said spring and normally in engagement with the recess on the threaded portion of the spindle, and a key having a projection to engage the spring aforesaid to withdraw the pawl from the recess.

2. In a nut lock, the combination of a spindle having the outer threaded end thereof provided with a recess, an axle nut mounted on the threaded portion of the spindle and provided at its outer end with a key opening, a spring attached to the inner side of the outer inclosing end of the axle nut, a pawl carried by said spring and normally in engagement with the recess on the threaded portion of the spindle, and a key having a projection to engage the spring aforesaid to withdraw the pawl from the recess, said key being formed adjacent to said portion with a shoulder adapted to abut against the outer side of the outer inclosing end of the said nut to hold the same in such position as to disengage the pawl from the spindle.

In testimony whereof I affix my signature in presence of two witnesses.

AURELIUS J. GARRISON. [L. S.]

Witnesses:
 HERBERT J. TAYLOR,
 WM. H. AST.